(12) United States Patent
Fain et al.

(10) Patent No.: US 10,356,289 B2
(45) Date of Patent: Jul. 16, 2019

(54) METHOD AND APPARATUS OF CONVERTING A SMARTPHONE INTO A PORTABLE WEARABLE HIDDEN VIDEO CAMERA FOR CAPTURING AND RECORDING VIDEO AND STILL IMAGES OF AN EVENT

(71) Applicants: Vitaliy Samoylovich Fain, Worchester, MA (US); Samuel Vitaly Fain, Nashua, NH (US)

(72) Inventors: Vitaliy Samoylovich Fain, Worchester, MA (US); Samuel Vitaly Fain, Nashua, NH (US)

( * ) Notice: Subject to any disclaimer, the term of this patent is extended or adjusted under 35 U.S.C. 154(b) by 204 days.

(21) Appl. No.: 15/330,718

(22) Filed: Oct. 31, 2016

(65) Prior Publication Data

US 2017/0142298 A1    May 18, 2017

Related U.S. Application Data

(60) Provisional application No. 62/386,033, filed on Nov. 17, 2015.

(51) Int. Cl.
| | |
|---|---|
| *A45F 5/00* | (2006.01) |
| *H04N 5/225* | (2006.01) |
| *H04M 1/02* | (2006.01) |
| *H04N 7/18* | (2006.01) |

(52) U.S. Cl.
CPC ............ *H04N 5/2251* (2013.01); *A45F 5/00* (2013.01); *H04M 1/0264* (2013.01); *H04N 7/183* (2013.01); *A45F 2005/006* (2013.01); *A45F 2200/0516* (2013.01)

(58) Field of Classification Search
CPC ......... A45C 2011/002; A45F 2005/006; A45F 2200/0516; H04M 1/0264
See application file for complete search history.

(56) References Cited

U.S. PATENT DOCUMENTS

| | | | |
|---|---|---|---|
| 2006/0052064 A1* | 3/2006 | Goradesky | A45F 5/02 455/90.3 |
| 2011/0031287 A1* | 2/2011 | Le Gette | F16M 11/04 224/101 |

(Continued)

OTHER PUBLICATIONS

Cool-Mania. [Button spy camera—MP850]. Wayback Machine Internet Archive (Year: 2014).*

*Primary Examiner* — Clifford Hilaire
(74) *Attorney, Agent, or Firm* — AKC PATENTS, LLC (57) ABSTRACT

A simple method is presented, of converting a smartphone into a high quality portable wearable video/audio hidden camera. The conversion produces a camera with the typical for modern smartphones, very high resolution close to 20+ MP. The proposed method of smartphone conversion provides still another benefit: The estimated cost price of the additional new items needed for the conversion is totally less than $1.00 in mass production. As to the smartphone itself, it remains completely unchanged after the less-then-a-minute-long conversion process and can be returned to all its normal functions even quicker. This allows a user to avoid buying the second smartphone specially for conversion, that is, to have the camera in question almost "for free", because these days virtually any adult already has a smartphone anyway.

7 Claims, 4 Drawing Sheets

(56) References Cited

U.S. PATENT DOCUMENTS

2013/0270129 A1* 10/2013 Johnson ................ A45C 11/38
                                                    206/216
2014/0313377 A1* 10/2014 Hampton ............. H05K 5/0217
                                                    348/241
2016/0216477 A1*  7/2016 Barros ................ H04N 5/2252

* cited by examiner

METHOD AND APPARATUS OF CONVERTING A SMARTPHONE INTO A PORTABLE WEARABLE HIDDEN VIDEO CAMERA FOR CAPTURING AND RECORDING VIDEO AND STILL IMAGES OF AN EVENT

CROSS-REFERENCE TO RELATED APPLICATIONS

This application claims the benefit of U.S. Provisional Application No. 62/386,033, filed Nov. 17, 2015, which is incorporated herein by reference in its entirety.

BACKGROUND OF THE INVENTION

1. Field of the Invention

Embodiments of this invention relate to a portable system for making video/audio records and still photo images. More particularly, embodiments of the invention relate to a portable digital video/audio recording system designed to be secretly worn on a user's body and configured to be mounted in a plurality of locations on the user's body and, first of all, on a clothing article worn by the user.

There is more than one field of application for this invention. The following consideration presents the example of one of the most important of them:

By law, private citizens of the USA have the right to own and to carry (in the majority of the states reticently) firearms for the self-defense. However, the real use of a firearm for the self-defense entails one of the biggest fears of a lawful citizen in the aftermath of a possible shooting event: Even when the shooting is completely justified, an ensuing investigation, legal uncertainties, and almost inevitable charges by sometimes overzealous prosecutors can lead to emotional and financial ruin. The citizen's truthful description of events will be questioned and dismissed. His/her actions undertaken under the stress of mere seconds deciding life and death will be second-guessed by comfortable people leisurely discussing the matters under the blanket of police protection. The witnesses even if they exist are usually inclined to avoid the involvement in the investigation and trial and often are biased (see for example the Zimmerman/Martin story). In such a situation, having an indisputable video/audio record of an altercation could prove indispensable in improving the chances of a favorable outcome of the investigation and trial for the attacked citizen. Consequently, a secretly wearable video/audio recording device of some sort seems to be the logical means of providing such a record. The secretive manner of wearing such a device is usually preferable because in the areas with heightened criminality like e.g. inner cities where such a device can be particularly useful, its noticeability entails the heightened and usually not quite friendly attention that can provoke the otherwise avoidable attack.

2. Related Art

In fact, the numerous "spy cameras" of many types are widely presented on the market (see, for example,
http://www.bing.com/images/search?q=Wearable%20spy%20video%20camera%20wireless&qs=n&form=QBIR&pq=wearable%20spy%20video%20camera%20wireless&sc=0-25&sp=-1&sk=;
http://www.bing.com/images/search?q=eyeglasses+video+recorders&FORM=HDRSC2;
http://www.bing.com/images/search?q=wearable+cell+phone&gpvt=wearable+cell+phone&gpvt=wearable+cell+phone&gpvt=wearable+cell+phone&FORM=IGRE;
http://www.bing.com/images/search?q=wearable+video+recoerders&FORM=HDRSC2;
http://www.bing.com/images/search?q=wearable+recorders&gpvt=wearable+recorders&gpvt=wearable+recorders&gpvt=wearable+recorders&FORM=IGRE).

These cameras, however, usually have one to four shortcomings, of which the first three are serious enough: 1) The majority of the "spy-cameras" have pretty low resolution: 0.557 MP average with 2.074 MP max (see www.rediff.com and www.bing.com); 2) They are too expensive: the average retail price of a non-police body camera was in October 2015, $215.22 with max price $6,399 (see www.thehome-securitysuperstore.com, www.rediff.com and www.bing.com); 3) The ones with better resolution are too cumbersome for good concealment, in particular, too lengthy in the direction of the focal axis of the lens. The $4^{th}$ shortcoming of the cameras mounted on user's clothing articles consist in that, the relatively considerable weight of a camera pulls it down thus stretching the garment material above the camera and crumpling it below the camera. That is bound to attract the unwanted attention and to lead to the loss of the concealment.

BRIEF SUMMARY OF THE INVENTION

This invention allows the users to have the video/audio and still image recording device which is free of all four of the listed above shortcomings. The embodiments of this invention, both described below and the possible others, eliminate these shortcomings by providing a method and devices allowing the use of a smartphone as a perfect base for the wearable concealed video/audio and still image recording device unnoticeably mounted, in particular but not only, to an article of a user's clothing. The following facts are singling out a smartphone as the perfect base for the said applications:

1. Any smartphone contains in a ready state both a built-in high quality micro camera (in many models with resolution 20.0+MP) able to capture both videos/audios and still images, and a built-in memory for recording them, as well as the controlling them software;

2. As it was noted above, any wearable hidden camera is a quite an expensive device. The smartphone with its interior camera being its integral part is not at all an exception. Were the smartphone's retail price directly included into the retail price of the system presented in this invention, the retail price of the entire device could be even higher than the average retail price of a "spy" camera. Fortunately, this is not the case. The use of a smartphone as a base component of the offered in this invention contraption requires no changes whatsoever in a smartphone, its hardware and software, so switching it from its original telephone function to its work in the current invention and back does not create any problem or time spending. Along with the fact that these days virtually every adult person already owns a smartphone anyway, it means that the potential user of the system has no need whatsoever to spend money to purchase a separate smartphone for the camera: The proposed in this invention appliances allow the user to comfortably use one and the same, already present in his/her ownership smartphone as the telephone proper at one moment and as the carrier of the camera/memory assembly at the next moment. If a user still wants to use a separate telephone for each of the two functions, it is still free of charge: Since the users are usually renewing their smartphones every couple of years anyway, it is just enough to avoid throwing away the old smartphone when replacing it by the next generation one.

3. Very compact and remarkably thin, plane rectangular shape of any smartphone makes it the most appropriate wearable hidden video capturing/recording system, which is particularly important when it is mounted to an article of a user's clothing; this property of smartphones is used in this invention thus removing the mentioned above 4th shortcoming of many existing cameras.

It should be added to the above said that there exist and can be purchased for $1-$3 very small and convenient, ready to use wireless remote control units for smartphones, for example, Bluetooth' ones which, in particular, allow to switch video/audio and still capturing function on and off by operating the remote unit with a hand in a pocket;

The several embodiments of the appliances in question are possible, however just the three of them, directly intended for mounting the system to an article of a user's clothing and the simplest and cheapest ones at that are described in the present patent application.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE SEVERAL VIEWS OF THE DRAWING

The need in the present invention is caused by the inherent contradiction between the two requirements whom a hidden video/photo camera must satisfy. On the one hand, such a camera must be invisible for the people around its bearer meaning that it should be placed behind the non-transparent surface of his/her garment. On the other hand, the optical channel formed around the focal axis of the camera objective which is situated fully inside the smartphone housing should be continued outside of it along exactly the same axis until becoming open for the surrounding world.

One example of a possible embodiment of the solution of this contradiction can be seen in the FIGS. 1-3. The main element of this solution is the item called Coaxial Insert in this invention and shown in the FIG. 2. When the coaxial insert is properly installed in the camera aperture 102 in the rear flat side 103 of the smartphone housing, its main part, the tube section 110 just forms the required continuation of the mentioned optical channel with the tube section symmetry axis precisely continuing the focal axis of the camera objective 107. The additional merit of the described solution is the ability to use just the standard plastic housing of a smartphone.

Another embodiment of this invention shown in FIGS. 4-5 differs from the one in FIGS. 1-3 in that, the coaxial insert does not constitute the separate item; its tube section is cast as the organic part of the housing as a whole instead.

In still another embodiment of this invention shown in the FIGS. 6-12 only the main part of the coaxial insert, its tube section is used. Here it constitutes the part of the latch (FIGS. 6 and 10) locking the smartphone in holder (FIGS. 6 and 7).

These embodiments are described more in details in the next section.

DETAILED DESCRIPTION OF THE INVENTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning now to the detailed description of the invention, it should be noted that although the shapes and dimensions of smartphones of different models are varying pretty wide, all the considerations and conclusions presented in this patent application remain true for any smartphone with no exceptions. In particular, the Apple 5th Generation iPhone model has been randomly selected as the "prototype model" for the sketches illustrating explanations in this patent application.

Familiarization with the available sources (partly listed above) shows that the specifics of converting a smartphone into an easily concealable and reliably working video camera brings forward the two new technical problems never addressed before.

The first problem consists in that, the smartphone's objective lens assembly is situated inside its structure, covered by a sheet of glass and thus is completely mechanically unreachable from the outside. At the same time, the optical channel formed around the focal axis of the said lens assembly inside the smartphone should be continued outside of it along exactly the same axis and, further on, should pass the small hole in the garment material while retaining that same axis. Thus the first problem consists in retaining the coaxiality of parts of the optical channel inside and outside the smartphone.

The second problem consists in making the fact of the presence of a smartphone behind the front part of the user's garment as unnoticeable as possible. Obviously, the remarkable thinness of all smartphones makes the major contribution to the solution of this problem. However, the mentioned in the end of the section "Background of the invention" abnormalities in the appearance of the tissue in the front part of a garment caused by the weight of a camera,—these abnormalities still need to be taken care of.

The present invention offers the solutions of these two problems thus making the idea of converting a smartphone into the portable wearable hidden video camera realizable and profitable.

Several embodiments of these solutions can be proposed. In the present patent application, the three of them that seem particularly simple technologically and cost effective for a user are described.

Figure 1:
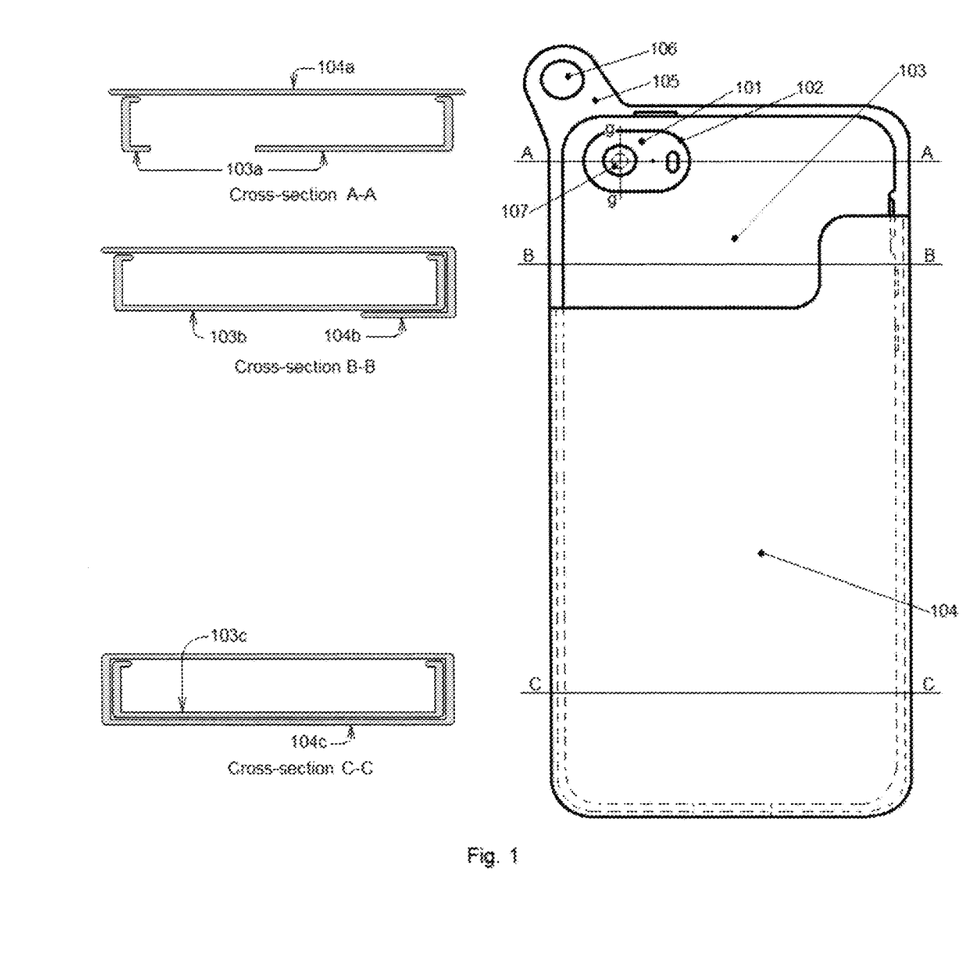

In one embodiment of the current invention, partly illustrated by the FIG. 1, the system consists of three components: a smartphone 101, a fragment of which is only visible through the aperture 102 in the phone's housing 103, a housing itself being a standard plastic one, and a pouch 104—just a pocket of an arbitrary material (plastic, metal, fabric etc.) with a lug 105 in its upper part. The cross-sections A-A, B-B, and C-C in the FIG. 1 allow to better comprehend the reciprocal positions of the housing (103a, 103b, 103c) and one of the possible pouches (104a, 104b, 104c). The smartphone 101 in the housing 103 enters the pouch 104 from above through its open top. The lug 105 has the hole 106 for a string intended for hanging the pouch 104 up on the user's neck. The reason for the seen on the FIG. 1 asymmetrical placing of the lug 105 on the pouch is the aspiration to achieve the most calm and stable status for the camera. That can be reached when the three points: the point of the suspension within the hole 106, the center of the camera objective, and the center of gravity of the whole assembly smartphone-housing-pouch are lying as close as possible to one and the same vertical straight line. For the mentioned "prototype model", for example, the most calm and stable position of the system in question and the said vertical line J-J are shown on the FIGS. 4 and 5 in the connection with the second embodiment of the invention.

The aperture 102 which is normally cut out in the non-transparent otherwise rear flat surface of any standard smartphone housing (see 103a on the cross-section A-A), allows the light picture of a scene to reach the camera's objective lens 107 thus ensuring the usability of the camera when it is used openly with the smartphone remaining in its housing. If, however, concealed use of the camera is needed, the problem arises, of ensuring the unperturbed visibility between the scene to be recorded and the camera's objective. In some existing systems with concealed cameras mounted on user's clothing articles, this problem is solved by using a "pseudo-button", that is, by trusting the receptacle of the objective's lens outside through a buttonhole and securing it there by screwing a cover with an aperture onto the end of the receptacle, the cover being disguised as a button (see, for example, U.S. Pat. No. 9,019,431 B2).

Unfortunately, this solution cannot be applied to a smartphone cameras because in such cameras the objective is mechanically inaccessible so the button-disguised cover with the aperture cannot be screwed on it.

Figure 2:
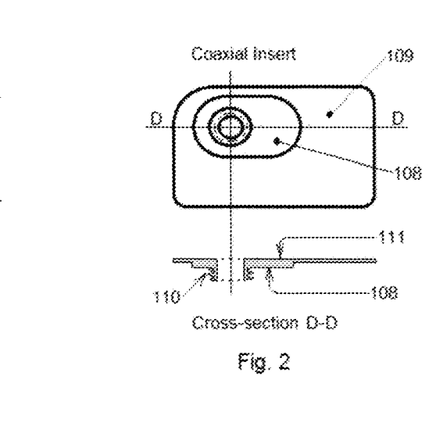

In this embodiment of the invention, the solution of the said problem is presented in the form of a new component named the "coaxial insert" and shown on FIG. 2. The coaxial insert ensures the proper position of the smartphone's camera lens with respect to the hole in an article of a user's clothing thus maintaining the entire optical channel rectilinear. This is achieved in the following way.

The protrusion 108 on the thin flat platform 109 of the coaxial insert has the shape that is exactly corresponding to the shape of the existing aperture 102 (FIG. 1) in the standard housing 103 (FIG. 1) and the thickness of the protrusion 108 (minus the one of the platform 109, see the cross-section D-D) is equal to the thickness of the surrounding the aperture plastic material of the housing 103. The coaxial insert should be placed between the housing 103 and the smartphone 101 in such a way that its side 111 is turned to the glass surface of the smartphone 101 while the protrusion 108 is inserted into the aperture 102 in the housing 103. After placing the smartphone 101 into the housing 103 with the coaxial insert inserted, the coaxial insert turns out to be pressed to the glass surface of the smartphone 101, the pressure being passed through the platform 109 by the elasticity of the material of the housing 103. In this situation, the tube section with the outer thread 110 (FIG. 2) of the coaxial insert turns out to be positioned in all three coordinates precisely as it should be thus securing the required, coaxial with the lens, optical channel. It is important to note that inserting the coaxial insert protrusion 108 into the aperture 102 in the housing 103 and then putting the smartphone into its place in the housing 103—these two elementary seconds-long actions accomplish the whole process of converting a smartphone into the wearable camera.

Figure 3:
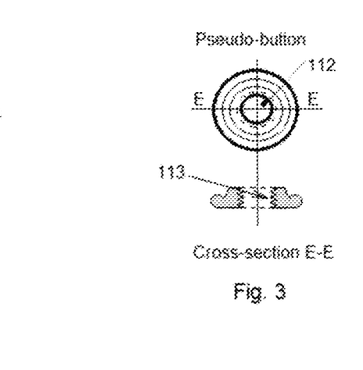

To place this wearable camera in its working position, the end of the tube section with the outer thread 110 should be pushed through the button- or any other hole in the outer layer of the user garment's fabric and fastened there by the pseudo-button (FIG. 3). The pseudo-button has the hole 112 with the inner thread 113 (see the cross-section E-E) which corresponds to the outer thread 110 on the tube section of the coaxial insert. This completes the solution of the problem of coaxial optical channel.

The second problem, the one with the abnormalities in the appearance of the tissue in the front part of a user's garment caused by the weight of a camera is solved in this invention as well. The solution is based on removing the weight of the smartphone-housing-pouch assembly from the button- or other hole in the user garment's fabric by transferring it to the string loop hanging from the user's neck. To do so, the string is also running through the hole 106 in the lug 105 (FIG. 1) thus suspending the said assembly on the height defined by the length of the string loop. This solution, simple as it is, allows to adjust the vertical position of the assembly by merely changing the length of the loop so that the tube section 110 turns out to be at the same height as the button- or another intended hole in the external layer of the garment; then the loop is to be tied. This simplicity is important because the re-positioning of the assembly is bound to be done virtually always when the user's garment is changed.

The reason why the just described embodiment of the current invention was selected to be first to discuss, consists in the fact that the conversion of a smartphone into the portable wearable hidden video camera does not require in this embodiment any changes whatsoever both in the smartphone itself and in its standard housing. Just a simple and cheap addition, the coaxial insert, solves the problem. The same relates to the transition from one smartphone model to another one: Only the shape of the coaxial insert needs to be changed in accordance with the shape of the aperture and the shape (flat or slightly convex, as in some smartphones sold by AT&T) of the smartphone surface within the aperture. Also, if necessary, a new pouch of the proper size and the new position of the lug should be provided. It is worth noticing in this connection that the pouch 104 on the FIG. 1 (and FIG. 5 below) is just an example of the pouch which corresponds to the mentioned "prototype model" of a smartphone and supposed to be made of molded plastic; however, since not much precision is required from a pouch, it can be easily sewn together of, for example, a dense fabric by a user him- or herself. These facts are supposed to make this embodiment the cheapest and thus the most attractive one commercially.

Figure 4:
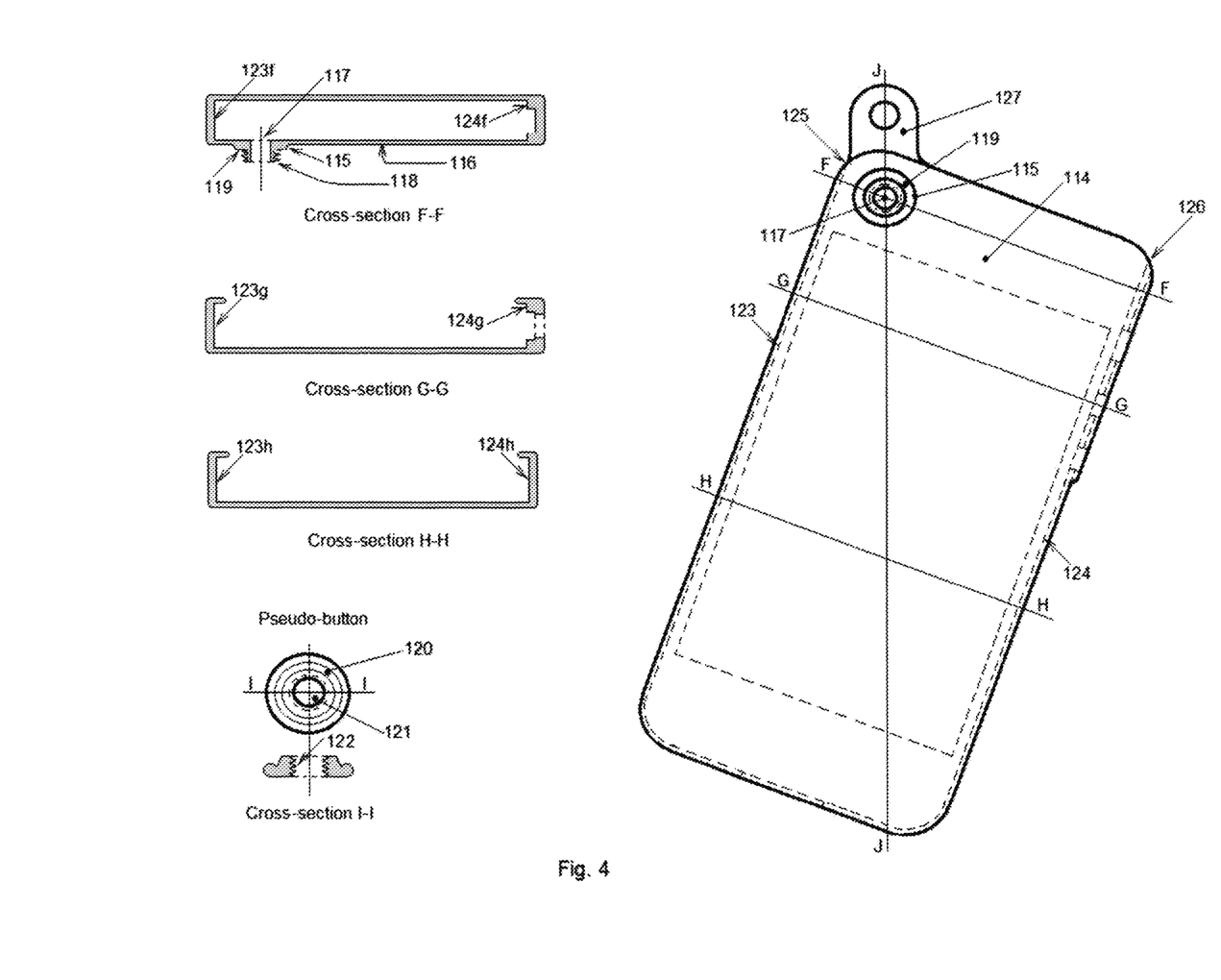

Another embodiment of the current invention differs from the previous one in that, there is no coaxial insert as the separate component. Instead, the corresponding alteration shown on FIG. 4 is made in the design of the smartphone's housing 114 itself. The ring-shaped bulge 115 is made on the flat surface 116 of the housing around the point 117 where the focal axis of the camera lens passes through. The bulge 115 serves as a pedestal for the tube section with the outer thread 118. The flat surface 119 of the bulge 115 is also used as the base for clasping the user garment's fabric with the pseudo-button 120 having the hole 121 with the inner thread 122 as it is shown on the cross-section I-I.

The housing 114 envelopes the smartphone as tightly as it is necessary to maintain the focal axis of the smartphone lens and the axis of the tube section 118 strictly coaxial. The smartphone enters the housing 114 from above. This is possible because the inner side walls 123 and 124 are flat and remain so up to the points 125 and 126 (see also the cross-sections F-F, G-G, and H-H). The smartphone stays in the lowest position in the housing due to the gravity force.

Figure 5:
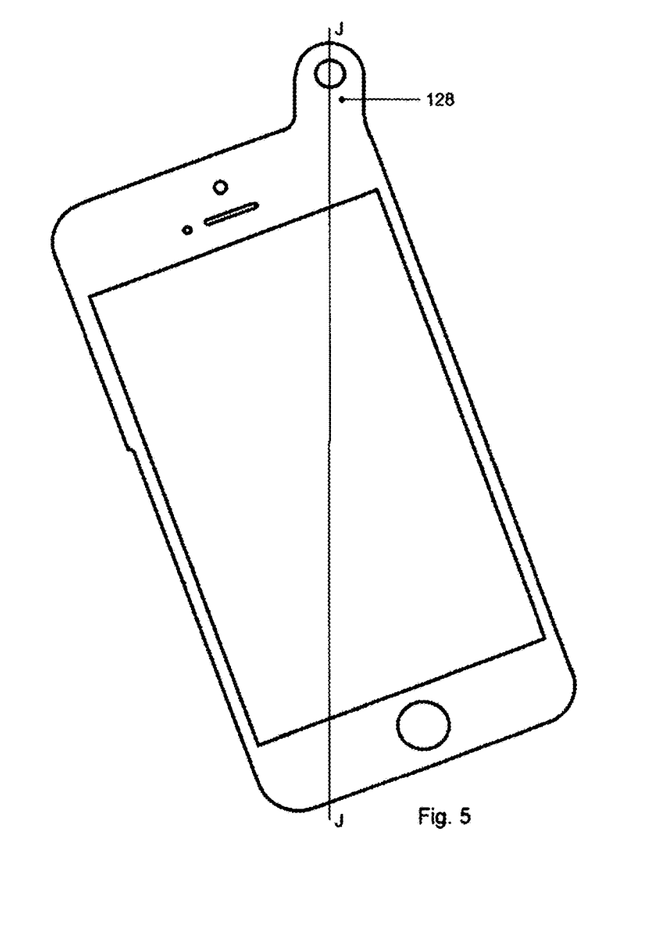

Since in this embodiment not the standard housing but the one with the altered design is used anyway, it makes sense, to enter still another design alteration: to move the suspending lug from the pouch to the housing itself as it is shown as 127 on the FIG. 4 and as 128 on the FIG. 5 where the housing is shown from the smartphone's screen side. In this case, there is no need in the pouch at all. Thus, in this embodiment of the current invention the system consists not of 3 but of only 2 components which makes it somewhat simpler and more affordable.

In still another embodiment of the current invention, the version of the system is presented that also consists of 2 components, however, in this case the housing as such is absent while its function is added to the pouch's one. For the sake of brevity this combination is called combo below. The combo is mostly made of a moderately restoring sheet metal less than 1 mm thick or of hard and moderately restoring cast plastic of about the same thickness.

Figure 6:
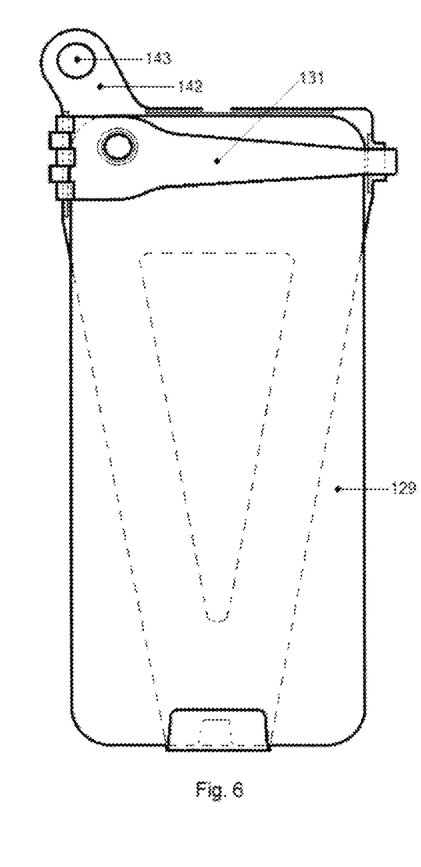
Figure 7:
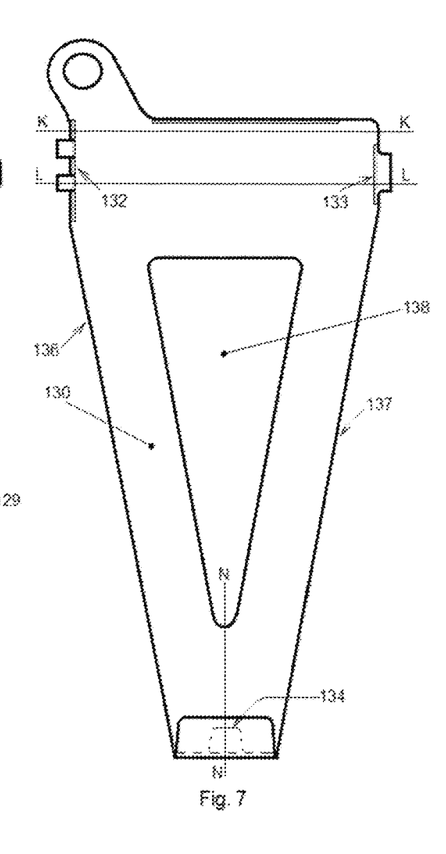
Figure 8:
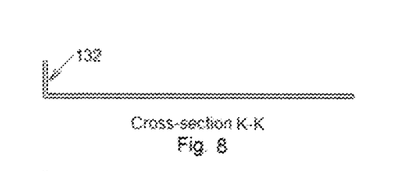
Figure 9:
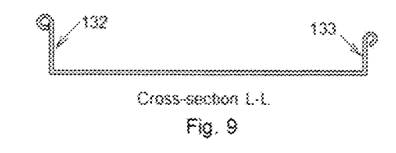
Figure 10:
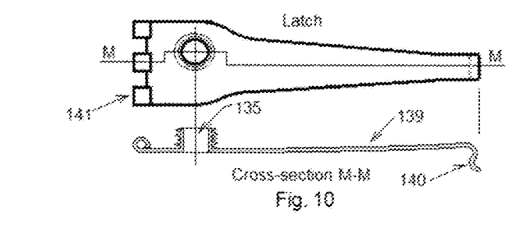
Figure 11:
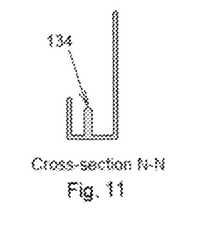
Figure 12:
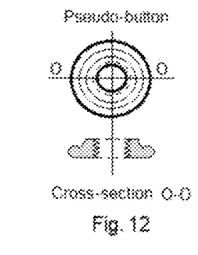

The general view of the smartphone 129 locked in the "pouch" is shown on the FIG. 6. The combo consists of two parts: the base 130 (FIGS. 7, 8, 9, and 11) and the latch 131 (FIGS. 6 and 10) with the pseudo-button (FIG. 12). The "upside-down-delta-like" shape of the base serves two purposes.

First, its three stops (132 on FIGS. 7, 8, 9; 133 on FIGS. 7, 9; and 134 on FIGS. 7, 11) provide precise and reliable hold of the smartphone which is necessary for securing, along with the tube section with the outer thread 135 (FIG. 10) the straightness of the optical channel. Second, the converging sidelines 136 and 137 along with the triangle-like notch 138 (FIG. 7) are helping to make the base lighter.

The latch (FIGS. 6 and 10) serves two purposes as well. First, its slightly curved, resilient body 139 (FIG. 10) provides, after snapping it shut by the snap 140, for the complete immobility of the smartphone with respect to the base. Second, the wide and tight hinge 141 guarantees the preservation of the necessary coaxiality of the axis of the tube section 135 with the focal axis of the smartphone's lens.

The pseudo-button (FIG. 12) can be the same as in the previous two embodiments of the current invention. This relates also to the holey lug 142 (FIG. 6, 7).

In the current embodiment of the invention, the following procedure of putting the smartphone into the combo should be followed. In the bottom of the base, the insert 134 (FIGS. 7 and 11) made of an electrically non-conductive material, e.g. plastic, is installed, its shape corresponding to the electrical socket located in the bottom of a smartphone (in this example—the mentioned "prototype model"). With the latch fully open, the smartphone should be laid onto the base so that its bottom end lacked reaching the lower end of the base for about 0.5 inch. Then the smartphone should be shifted along the base down to its lower end so that its socket got the insert 134 inside. Since the stops 132 and 133 had already established the correct position of the upper part of the smartphone and now the insert 134 did it to its lower part, the latch should be snapped, the tube section 135 should be pushed through the fabric of the user's garment and fixed there with the pseudo-button FIG. 12. Finally, a string should be pushed through the hole 143, conducted around the user's neck, adjusted to the adequate length, and tied.

This embodiment is intended for the situations when the standard housing for a given smartphone model is not available or when the standard housing is uncomfortably thick.

Having thus described various embodiments of the invention, what is claimed as new and desired to be protected by a Patent includes the following:

1. A portable video system comprising:
    a smartphone comprising a high quality interior camera;
    a smartphone's housing;
    a coaxial insert;
    a pouch configured to accommodate the smartphone, the housing and the coaxial insert and providing mechanical support for placing the video system at an optimal place under an outer layer of a user's garment;
    wherein the coaxial insert comprises a tube section that forms an external to the smartphone optical channel that is coaxial with an optical axis of a lens of the smartphone's interior camera;
    wherein the tube section extends from an outer surface of the smartphone and passes through an opening in the user's garment to the outer layer of the user's garment; and
    wherein the portable video system is configured to be wearable on the user's body and to be hidden from view and to secretly capture and record video, audio and still images of an event with the camera;
    wherein the tube section comprises outer threads and the tube section with the outer threads protrudes through the opening in the user's garment and engages inner threads in a button that fastens the tube section to the user's garment;
    wherein the pouch comprises a lug with a hole in it and a string pulled through the hole and forming a loop around the user's neck, and wherein the length of the string determines the height of the pouch's suspension on the user's body.

2. The portable video system of claim 1, wherein the coaxial insert is shaped and dimensioned to be placed exactly over the lens of the smartphone's camera so that the optical axis of the smartphone's interior HD camera lens coincides with the coaxial insert's axis.

3. The portable video system of claim 1, wherein the coaxial insert forms one unit with the smartphone's housing.

4. The portable video system of claim 3, wherein the smartphone's housing comprises a lug with a hole in it and the lug is part of a rear side of the smartphone's housing and wherein a string pulled through the hole forms a loop around the user's neck, and the length of the string determines the height of the housing's suspension on the user's body.

5. The portable video system of claim 1, wherein the smartphone's housing and the pouch form a combined unit and the position of the smartphone within the combined unit is set by a latch snapping the smartphone to the combined unit's base.

6. A portable video system comprising:
    a smartphone comprising a high quality interior camera;
    a smartphone's housing comprising a coaxial insert;
    wherein the smartphone's housing and the coaxial insert provide mechanical support for placing the video system at an optimal place under an outer layer of a user's garment;

wherein the smartphone's position within the smartphone's housing is set by a latch snapping the smartphone to the smartphone's housing base;

wherein the coaxial insert comprises a tube section that forms an external to the smartphone optical channel that is coaxial with an optical axis of a lens of the smartphone's interior camera;

wherein the tube section extends from an outer surface of the smartphone and passes through an opening in the user's garment to the outer layer of the user's garment; and wherein the portable video system is configured to be wearable on the user's body and to be hidden from view and to secretly capture and record video, audio and still images of an event with the camera;

wherein the tube section comprises outer threads and the tube section with the outer threads protrudes through the opening in the user's garment and engage inner threads in a button that fastens the tube section to the user's garment; and wherein the housing comprises a lug with a hole in it and a string pulled through the hole and forming a loop around the user's neck, and wherein the length of the string determines the height of the housing's suspension on the user's body.

7. A portable video system comprising:

a smartphone comprising a high quality interior camera;

a smartphone's housing comprising a coaxial insert;

wherein the smartphone's housing and the coaxial insert provide mechanical support for placing the video system at an optimal place under an outer layer of a user's garment;

wherein the coaxial insert comprises a tube section that forms an external to the smartphone optical channel that is coaxial with an optical axis of a lens of the smartphone's interior camera;

wherein the tube section extends from an outer surface of the smartphone and passes through an opening in the user's garment to the outer layer of the user's garment; and wherein the portable video system is configured to be wearable on the user's body and to be hidden from view and to secretly capture and record video, audio and still images of an event with the camera;

wherein the tube section comprises outer threads and the tube section with the outer threads protrudes through the opening in the user's garment and engage inner threads in a button that fastens the tube section to the user's garment; and wherein the housing comprises a lug with a hole in it and a string pulled through the hole and forming a loop around the user's neck, and wherein the length of the string determines the height of the housing's suspension on the user's body.

* * * * *